United States Patent
Van Den Berg

(10) Patent No.: US 10,039,259 B2
(45) Date of Patent: Aug. 7, 2018

(54) IMPLEMENT FOR AUTOMATICALLY MILKING A DAIRY ANIMAL

(71) Applicant: MAASLAND N.V., Maassluis (NL)

(72) Inventor: Karel Van Den Berg, Bleskensgraaf (NL)

(73) Assignee: MAASLAND N.V., Maassluis (NL)

( * ) Notice: Subject to any disclaimer, the term of this patent is extended or adjusted under 35 U.S.C. 154(b) by 618 days.

(21) Appl. No.: 14/327,583

(22) Filed: Jul. 10, 2014

(65) Prior Publication Data

US 2014/0318459 A1 Oct. 30, 2014

Related U.S. Application Data

(63) Continuation of application No. 12/439,824, filed on Mar. 4, 2009, now Pat. No. 8,807,080, which is a
(Continued)

(30) Foreign Application Priority Data

Sep. 5, 2006 (NL) .................................. 1032435

(51) Int. Cl.
*A01J 3/00* (2006.01)
*A01J 5/00* (2006.01)
(Continued)

(52) U.S. Cl.
CPC ............. *A01J 5/017* (2013.01); *A01J 5/0175* (2013.01); *G01S 17/42* (2013.01); *G01S 17/88* (2013.01); *Y10S 901/09* (2013.01); *Y10S 901/46* (2013.01)

(58) Field of Classification Search
USPC ......... 119/14.03, 14.08, 14.01, 14.02, 14.14, 119/14.47, 14.18, 670; 901/46
See application file for complete search history.

(56) References Cited

U.S. PATENT DOCUMENTS

| 4,560,270 A | 12/1985 | Wiklund et al. |
| 5,042,428 A * | 8/1991 | Van der Lely ........ A01J 5/0175 |
| | | 119/14.08 |

(Continued)

FOREIGN PATENT DOCUMENTS

| CA | 2539645 A1 | 9/2007 |
| EP | 0300115 A1 | 1/1989 |

(Continued)

OTHER PUBLICATIONS

Scannerless imaging pulsed-laser range finding, by Heikki Ailisto et al, p. S337-S346, Institute of Physics Publishing, Journal of Optics A: Pure and Applied Optics, PII: S1464-4258(02)36464-X, published 2002.*

(Continued)

*Primary Examiner* — Andrea Valenti
(74) *Attorney, Agent, or Firm* — Hoyng Rokh Monegier LLP; Ramin Amirsehhi

(57) ABSTRACT

An implement for automatically milking a dairy animal, such as a cow, comprises a milking parlour, a sensor for observing a teat, and a milking robot for automatically attaching a teat cup to the teat. The milking robot comprises a robot control that is connected to the sensor. The sensor comprises a radiation source for emitting light, a receiver for receiving electromagnetic radiation reflected from the dairy animal, a lens, and sensor control unit. The sensor comprises a matrix with a plurality of rows and a plurality of columns of receivers. The sensor control unit is designed to determine for each of the receivers a phase difference between the emitted and the reflected electromagnetic radiation in order to calculate the distance from the sensor to a plurality of points on the part to be observed of the dairy animal.

19 Claims, 3 Drawing Sheets

Related U.S. Application Data continuation of application No. PCT/NL2007/000210, filed on Aug. 28, 2007.

(51) Int. Cl.
  *A01J 5/017* (2006.01)
  *G01S 17/42* (2006.01)
  *G01S 17/88* (2006.01)

(56) References Cited

U.S. PATENT DOCUMENTS

| | | | |
|---|---|---|---|
| 5,070,483 A | 12/1991 | Berni | |
| 5,109,362 A | 4/1992 | Berni | |
| 5,311,271 A * | 5/1994 | Hurt | G01S 17/36 342/118 |
| 5,379,721 A | 1/1995 | Dessing et al. | |
| 5,383,423 A | 1/1995 | Van Der Lely | |
| 5,412,420 A | 5/1995 | Ellis | |
| 5,546,475 A | 8/1996 | Bolle et al. | |
| 5,915,331 A | 6/1999 | Kimm | |
| 6,118,118 A | 9/2000 | Van Der Lely et al. | |
| 6,323,942 B1 * | 11/2001 | Bamji | G01C 3/08 348/E3.018 |
| 6,341,575 B1 | 1/2002 | Forsén | |
| 6,847,435 B2 * | 1/2005 | Honda | G01C 3/08 356/141.2 |
| 7,568,447 B2 * | 8/2009 | Peacock | A01J 5/0175 119/14.08 |
| 7,663,502 B2 | 2/2010 | Breed | |
| 7,853,046 B2 * | 12/2010 | Sharony | A01K 29/00 356/603 |
| 2001/0048519 A1 | 12/2001 | Bamji et al. | |
| 2003/0233983 A1 * | 12/2003 | Kortekaas | A01J 5/0175 119/14.1 |
| 2004/0021057 A1 | 2/2004 | Drownley | |
| 2005/0136819 A1 | 6/2005 | Kriesel | |
| 2005/0223998 A1 | 10/2005 | Bosma et al. | |
| 2006/0222207 A1 | 10/2006 | Balzer et al. | |
| 2007/0215052 A1 | 9/2007 | Metcalfe et al. | |
| 2010/0006034 A1 | 1/2010 | Van Den Berg | |
| 2010/0006127 A1 | 1/2010 | Van Den Berg | |
| 2010/0017035 A1 | 1/2010 | Van Den Berg | |
| 2010/0049392 A1 | 2/2010 | Vlaar et al. | |
| 2010/0076641 A1 | 3/2010 | Van Den Berg | |
| 2010/0077960 A1 | 4/2010 | Van Den Berg et al. | |
| 2010/0154722 A1 | 6/2010 | Van Den Berg et al. | |

FOREIGN PATENT DOCUMENTS

| | | |
|---|---|---|
| EP | 1253440 A1 | 10/2002 |
| EP | 1332668 A1 | 8/2003 |
| EP | 1442657 A1 | 8/2004 |
| EP | 1537775 A1 | 6/2005 |
| EP | 1862360 A1 | 12/2007 |
| JP | H9-275836 A | 10/1997 |
| JP | H10-033079 A | 2/1998 |
| JP | H10-033080 A | 2/1998 |
| JP | 2004-525351 A | 8/2004 |
| WO | 00/04765 A1 | 2/2000 |
| WO | 00/11936 A1 | 3/2000 |
| WO | 02/49339 A2 | 6/2002 |
| WO | 2004/072677 A1 | 8/2004 |
| WO | 2005/094565 A1 | 10/2005 |
| WO | 2007/104124 A1 | 9/2007 |

OTHER PUBLICATIONS

Letter regarding the opposition procedure dated Mar. 9, 2015 filed by the Opponent in opposition procedure against counterpart EP2059834.

Letter filed by Proprietor EP2059834 on Aug. 5, 2009 as a third party observation against EP Application No. 06804778.6.

R. Lange et al, "Solid-State Time-of-Flight Range Camera", IEEE Journal of Quantum Electronics, vol. 37, No. 3, Mar. 2001.

J. Weingarten et al, "A State-of-the-Art 3D Sensor for Robotic Navigation", Proceedings 2004 IEEE/RJS International Conference on vol. 3, Issue, Sep. 28-Oct. 2, 2004, p. 2155-2160, Oct. 2004.

International Search Report for PCT/NL2007/000210 dated Nov. 30, 2007.

International Preliminary Report on Patentability for PCT/NL2007/000210 dated Mar. 10, 2009.

Schwarte, Rudolf, "Dynamic 3D-Vision", Proceedings of EDMO 2001/Vienna, 2001.

Oggier, T., et al, "Miniature 3D TOF Camera for Real-Time Imaging", in: Perception and Interactive Technologies, Proceedings of International Tutorial and Research Workshop, PIT 2006, Kloster Irsee, Germany, Jun. 2006, Springer.

* cited by examiner

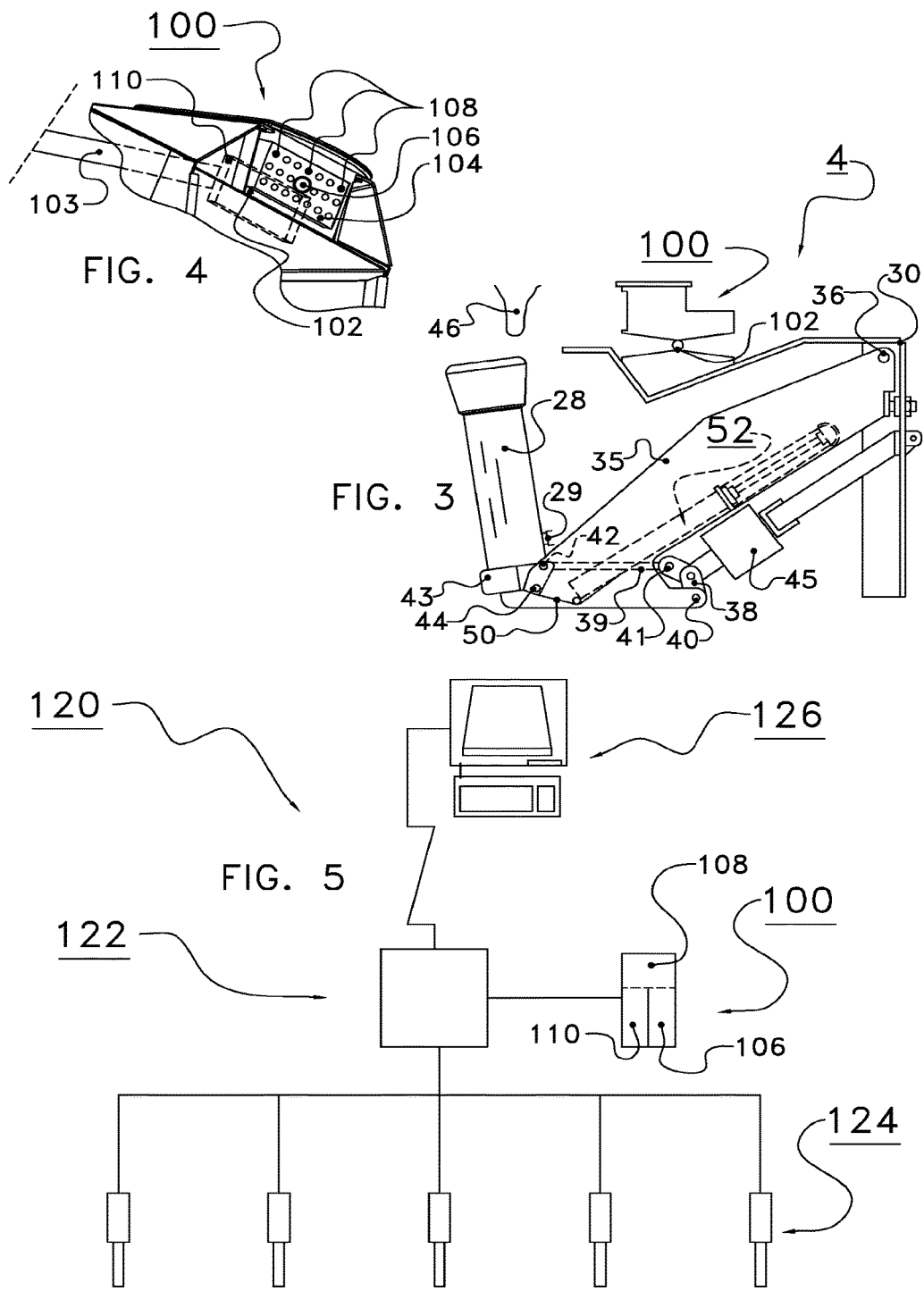

IMPLEMENT FOR AUTOMATICALLY MILKING A DAIRY ANIMAL

CROSS REFERENCE TO RELATED APPLICATIONS

This application is a continuation of U.S. patent application Ser. No. 12/439,824 filed on 4 Mar. 2009, which is a continuation of PCT application number PCT/NL2007/000210 filed on 28 Aug. 2007, which claims priority from Netherlands application number 1032435 filed on 5 Sep. 2006. The contents of these applications are hereby incorporated by reference in their entireties.

BACKGROUND OF THE INVENTION

1. Field of the Invention

The invention relates generally to an implement for automatically milking a dairy animal, such as a cow.

2. Description of the Related Art

European patent EP0360354A1 discloses an implement for automatically milking a cow, which is provided with a robot arm. At an end of the robot arm there is provided a sliding element that is movable relative to the robot arm. At the same end of the robot arm there are provided holders for four teat cups. Each of the teat cups may be connected to a vertically movable cylinder by means of a magnetic coupling. The robot arm is movable and is capable of being brought with the teat cups to under a teat of an udder of the cow to be milked. Subsequently, it is possible to attach one of the teat cups to the teat by moving said teat cup upward by means of the cylinder.

On the sliding element there are provided sensor means determining in each case a position of the next teat to which a teat cup has to be attached. Said sensor means comprise a laser, a mirror, a lens, and a receiver. The laser emits light that is partially reflected by the teat. Via the minor the reflected light is led to the lens that images the light onto the receiver. The sensor is capable of rotating about a vertical axis, so that the laser performs a scanning movement. Sensor electronics are connected to the receiver. The sensor electronics are capable of determining the distance and the angle of the teat relative to the sensor on the basis of a signal from the receiver and on the basis of the momentary angle of the sensor at the moment when the latter receives a signal. Thanks to the scanning movement information regarding the position of the teat is obtained in each case along one (in practice horizontal) line. In order to obtain also information regarding the vertical position, the robot arm with the scanner as a whole performs a vertical movement. On the basis of the distance information thus obtained, the robot arm is moved to the teat.

A drawback of the known milking implement is that moving the robot arm with teat cups towards the teat does not always take place in a reliable manner.

BRIEF SUMMARY OF THE INVENTION

The invention aims at obviating the above-mentioned drawbacks at least partially, or at providing at least an alternative.

This object is achieved by the invention with an implement for automatically milking a dairy animal, such as a cow, comprising a milking parlour, a sensor for observing at least a part of the dairy animal, such as a teat, as well as a milking robot for automatically attaching a teat cup to the teat. The milking robot comprises a robot control that is operatively connected to the sensor. The sensor comprises a radiation source for emitting electromagnetic radiation, in particular light, a receiver for receiving electromagnetic radiation onto the received, and a sensor control unit. The sensor comprises a matrix with a plurality of rows and a plurality of columns of receivers. The sensor control unit is operatively connected to the radiation source in order to modulate the electromagnetic radiation. The sensor control unit is further designed to determine for each of the receivers a phase difference between the emitted and the reflected electromagnetic radiation in order to calculate distances from the sensor to a plurality of points on the dairy animal.

By using such a matrix of receivers and by determining for these receivers, by means of the phase shifting of the emitted light, distances to the dairy animal, there is obtained per observation a complete, three-dimensional image of, for example, the teat. This three-dimensional image is in fact composed in one go, instead of by scanning. Moreover, it is not, or at least less than in the state of the art, distorted by movements of the entire dairy animal and/or its teat during the observation. Moreover, it is not necessary to move the robot arm to compose a complete image. As a result, there is a greater chance that the milking robot is moved in the right direction than in the case of EP0360354A1.

In one embodiment, the sensor control unit is further designed to determine a phase difference between the emitted and the reflected electromagnetic radiation in order to calculate distances from the sensor to a plurality of points on the teat cup. By further determining the distances to the teat cup, it is possible for the robot control to take the actual position and/or orientation of the teat cup into account when controlling the milking robot.

In particular, the robot control is designed to calculate the mutual distance between the teat cup and the teat and to control the milking robot on the basis of the calculated mutual distance. By further determining the mutual distance between the teat cup and the animal to be milked, the milking robot can be controlled in an even more reliable manner.

More in particular, the robot control is designed to monitor the connection between an attached teat cup and the teat concerned. A separate sensor for monitoring this connection is thus saved.

In a particular embodiment, the sensor control unit is designed to determine repeatedly the phase difference between the emitted and the reflected electromagnetic radiation in order to calculate distances from the sensor to a plurality of points on the teat and on the teat cup, and the robot control is designed to determine with the aid thereof the mutual speed between the attached teat cup and the teat concerned.

In one embodiment, the sensor control unit is further designed to determine a phase difference between the emitted and the reflected electromagnetic radiation in order to calculate distances from the sensor to a plurality of points on at least one leg of the animal to be milked, and the robot control is designed to control the milking robot also on the basis thereof. In this manner the sensor control unit provides information needed to navigate the milking robot in such a way that the latter will not touch the leg of the dairy animal.

In a favourable embodiment, the robot control is designed to determine whether the dairy animal should be milked on the basis of the calculated distances from the sensor to the plurality of points on the teat and/or on the basis of calculated distances from the sensor to a plurality of points on an udder. On the basis of the observed and calculated distances, the robot control is capable of making a three-dimensional image of the udder and/or the teats. It is possible to deduce therefrom whether these are swollen to such an extent that it can be concluded therefrom that sufficient milk has been produced and that this milk has descended.

In one embodiment, the robot control is designed to identify the dairy animal on the basis of the calculated distances from the sensor to the plurality of points on the dairy animal. By creating a three-dimensional image of the dairy animal, it is possible to recognize the dairy animal on the basis of unique individual spatial properties.

In a favourable embodiment, the robot control is designed to control cleaning brushes for cleaning the teat of the dairy animal on the basis of the calculated distances from the sensor to the plurality of points on the teat of the dairy animal and/or on the basis of calculated distances from the sensor to a plurality of points on the cleaning brushes. By determining the distances both to the teat and to the cleaning brush, it is possible to deduce indirectly the pressure on the teat and to modify, on the basis thereof, the adjustment of the relevant cleaning brush. By only observing the cleaning brush and repeating this observation periodically, it is possible to calculate a rotational speed of the relevant cleaning brush, from which also the pressure on the teat can be deduced.

In one embodiment, the robot control is designed to be able to start a cleaning process of the milking parlour if the robot control establishes that there is no dairy animal in the milking parlour on the basis of the observation by the sensor. A separate sensor for this task is thus saved.

A favourable embodiment further comprises a cleaning device for cleaning at least the teat cup, wherein the sensor control unit is further designed to determine a phase difference between the emitted and the reflected electromagnetic radiation in order to calculate distances from the sensor to a plurality of points on the cleaning device, and the robot control is designed to control, on the basis thereof, the milking robot in such a way that the teat cup is moved to the cleaning device in order to be cleaned. By controlling the milking robot on the basis of the currently measured spatial position of the cleaning device, the teat cup will be moved to the latter in a reliable manner, also if the cleaning device has been displaced relative to an initial position because, for example, a cow has knocked against it.

For a better understanding of favourable embodiments to be described hereinafter, first a possible sensor of the milking implement according to the invention will be set out here in further detail. The radiation source emits electromagnetic radiation. Preferably light is used for this purpose, more preferably infrared radiation, more preferably near infrared (NIR) radiation. For this purpose, in particular suitable LED's may be used, which can be controlled in a very simple manner by means of an electrically controllable supply current, and which are moreover very compact and efficient and have a long life. Nevertheless, other radiation sources might be used as well. (Near) infrared radiation has the advantage of not being annoying for the dairy animals.

The radiation is modulated, for example amplitude modulated, according to a modulation frequency which, of course, differs from, and is much lower than, the frequency of the electromagnetic radiation itself. The, for example, infrared light is here a carrier for the modulation signal.

With the aid of the emitted radiation the distance is determined by measuring a phase shift of the modulation signal, by comparing the phase of reflected radiation with the phase of reference radiation. For the latter the emitted radiation is preferably transferred (almost) immediately to the receiver. The distance can be determined in a simple manner from the measured phase difference by $$\text{distance} = \frac{1}{2} \times \text{wave length} \times (\text{phase difference}/2\pi),$$

in which the wave length is that of the modulation signal. It should be noted that in the above-mentioned equation unambiguity of the distance determination is not yet taken into account, which unambiguity occurs in that a phase difference owing to periodicity can belong to a distance A, but also to A+n×(wave length/2). For that reason it may be useful to choose the wave length of the amplitude modulation in such a way that the distances occurring in practice will indeed be determined unambiguously.

Preferably, a wave length of the modulation, for example amplitude modulation, of the emitted radiation is between 1 mm and 5 meters. With such a wave length it is possible to determine unambiguously distances up to a maximum distance of 0.5 mm to 2.5 meters. Associated therewith is a modulation frequency of 300 MHz to 60 kHz which can be achieved in a simple manner in electric circuits for actuating LED's. It is pointed out that, if desired, it is also possible to choose even smaller or greater wave lengths.

In a preferred embodiment, a wave length is adjustable, in particular switchable between at least two values. This provides the possibility of performing, for example, first a rough measurement of the distance, with the aid of the great modulation wave length. For, this wave length provides a reliable measurement over great distances, albeit with an inherent lower resolution. Here, it is assumed for the sake of simplicity that the resolution is determined by the accuracy of measuring the phase, which can be measured, for example, with an accuracy of y %. By first measuring with the great wave length it is possible to measure the rough distance. Subsequently, it is possible to perform, with a smaller wave length, a more precise measurement, wherein the unambiguity is provided by the rough measurement.

For example, first a measurement is performed with a wave length of 2 m. The accuracy of the phase determination is 5%. The measured phase difference amounts to (0.8×2π) ±5%. The measured distance then amounts to 0.80±0.04 meter. Subsequently, measurement is performed with a wave length of 0.5 meter. The measured phase difference 0.12×2π modulo 2π. This means that the distance amounts to 0.12× 0.25 modulo 0.25, so 0.03 modulo 0.25 meter. As the distance should moreover amount to 0.80±0.04, the distance should be equal to 0.78 meter, but now with an accuracy of 0.01 meter. In this manner the accuracy can be increased step by step, and the different modulation wave lengths may be chosen on the basis of the accuracy of the previous step.

It is also advantageous, for example, first to determine roughly the position/distance with a great wave length, and subsequently to determine the speed from the change of position, which can indeed be determined unambiguously from the change of the phase difference, measured with a smaller wave length.

Instead of adjusting the wave length of the modulation, the wave length of the electromagnetic radiation itself may be adjustable and preferably switchable between two values. This offers, for example, the possibility of using a plurality of sensors, operating each with a mutually different wave length, simultaneously in one space.

In a preferred embodiment, the radiation source emits radiation in a pulsating manner, preferably with a pulsation frequency between 1 Hz and 100 Hz. Here, the pulsation length is preferably not more than ½ part, more preferably 1/n part of a pulsation period. This provides radiationless pauses between the pulsations, which may be used for other purposes, such as data transmission. To this end, the same radiation source might then be used for example, but now with a different transmitter protocol; however, no measurement nevertheless being suggested or disturbed by the sensor. Moreover, it is possible to use a different radiation source and/or sensor in the pauses, in which case mutual disturbance neither takes place.

Preferably, the radiation source has an adjustable light intensity and/or an adjustable angle of radiation. This provides the possibility of adapting the emitted radiation intensity or the emitted amount of radiation energy to the light conditions, which may result in energy saving. In the case of a short distance and a strong reflecting capacity, for example, less radiation is required than in the case of a great distance and a relatively strong absorbing capacity, of for example a dark animal skin or the like. It is also possible to adapt the angle of radiation to the angle of view of the sensor, because the angle of view of radiation does not have to be greater than that angle of view. It may be advantageous, for example, when observing a space, to choose a great angle of radiation, such as for example between 80° and 180°, because the angle of view used in that case will often be great as well. On the other hand, when 'navigating' the robot to the teat, the angle of radiation may also be chosen smaller, such as for example between 30° and 60°. Of course, many other angles of radiation are possible as well.

In a particular embodiment, an angle of view of the observation area of the sensor is adjustable. The angle of view may then be chosen, for example, in accordance with the observation object or area. It is advantageous, for example, when navigating to the teat, to choose the angle of view small with a corresponding higher resolution. It may also be advantageous to keep disturbing radiating objects, such as hot objects, away from the observation area by advantageously choosing the angle of view. To this end, it is possible, for example, to dispose an objective (lens) with variable focal distance ('zoom lens') in front of the sensor. It is also possible only to select a limited area of the receivers of the sensor. This is comparable with a digital zoom function.

In a particular embodiment, the matrix with a plurality of rows and a plurality of columns of receivers, and advantageously also the radiation source, is arranged pivotably. This provides the advantage that for observing different parts of the dairy animal only the receiver device and, possibly, also the radiation source, has to be pivoted. This is in particular advantageous if the angle of view, and possibly also the angle of radiation, is relatively small, in order to ensure in this manner a relatively high resolution. Nevertheless it is also possible, of course, to connect the receiver device and the radiation source rigidly to the milking robot, or a component of the milking parlour, for a maximum of constructive simplicity.

BRIEF DESCRIPTION OF THE DRAWINGS

The invention will now be explained in further detail with reference to exemplary embodiments shown in the accompanying figures, in which:

FIG. 3 is a side view of an end of a robot arm construction with the sensor being fastened in an alternative manner;

FIG. 4 is a spatial view of a sensor, and

FIG. 5 is a diagrammatic view of a control system of the implement according to the invention.

DESCRIPTION OF ILLUSTRATIVE EMBODIMENTS

Figure 1:
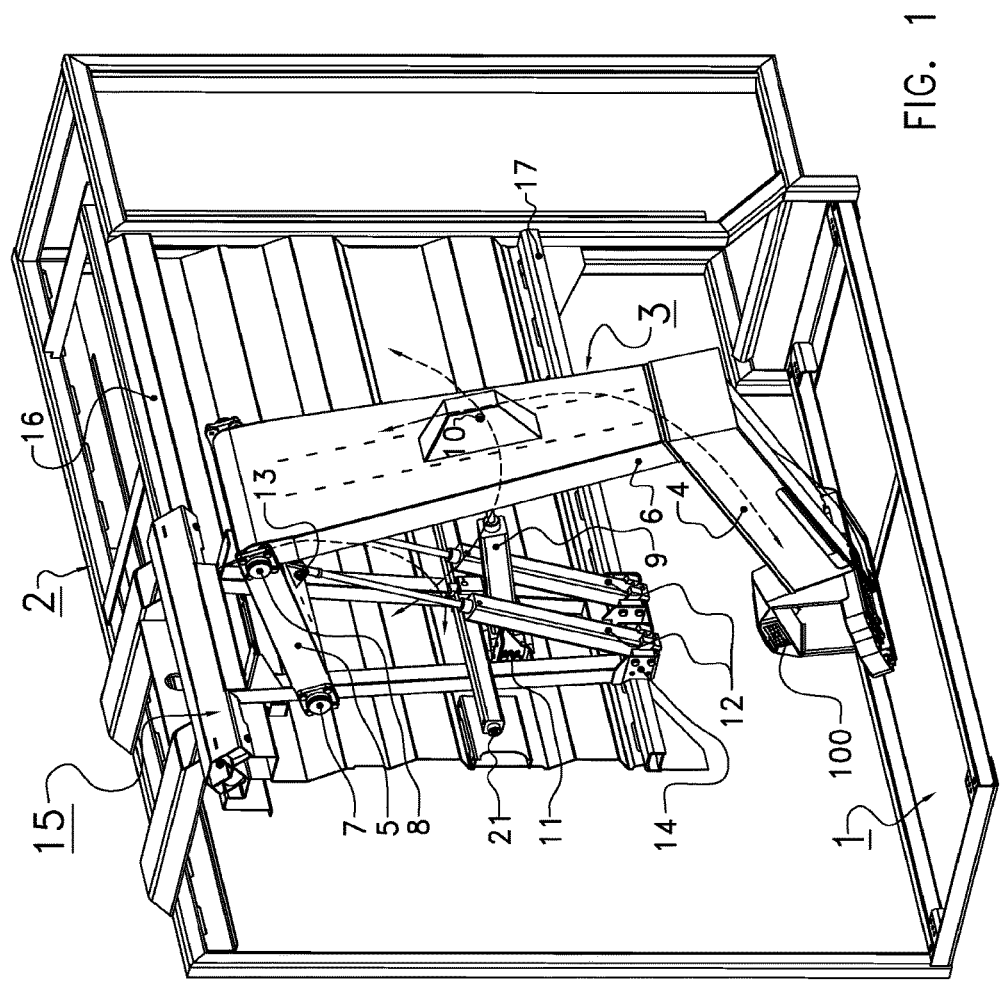
FIG. 1 is a diagrammatic perspective view of an implement with a robot arm construction and a sensor according to the invention.

The following is a description of certain embodiments of the invention, given by way of example only and with reference to the drawings. The implement for automatically milking an animal, such as a cow, shown in a diagrammatic perspective view in FIG. 1, comprises a milking parlour 1 that accommodates one single animal, such as a cow. This milking parlour 1 is surrounded in a customary manner by a fencing 2 and is provided with an entrance door and an exit door which are, incidentally, not shown in the figures. In the milking parlour 1 and in the immediate vicinity thereof there is a milking robot comprising a robot arm construction 3 for automatically attaching a teat cup to a teat of an animal to be milked. The robot arm construction is provided with a robot arm 4 for carrying a teat cup, which robot arm 4 is pivotable to under the udder of the animal (see FIG. 3).

The robot arm construction 3 is provided with a first robot arm construction portion 5 and a second robot arm construction portion 6. The first robot arm construction portion 5 is pivotably connected to an upper side of the fencing 2 by means of a first horizontal axle 7. The second robot arm construction portion 6 is pivotably connected to the first robot arm construction portion 5 by means of a second horizontal axle 8 that is located outside the milking parlour 1. The robot arm 4 is connected to the second robot arm construction portion 6. The robot arm 4 may be rigidly connected to the second robot arm construction portion 6, or may be connected thereto via a third horizontal and/or a vertical axle, so that the robot arm is pivotable relative to the second robot arm construction portion, for example with the aid of a control cylinder.

A first control cylinder 9 has a first point of application 10 on the second robot arm construction portion 6 and a second point of application 11 on the fencing 2 at a place at a first distance below the first horizontal axle 7. A second control cylinder 12 has a first point of application 13 on the first robot arm construction portion 5 and a second point of application 14 on the fencing 2 at a place at a second distance below the first horizontal axle 7, the second distance being greater than the first distance. The second control cylinder 12 may be a single control cylinder or may be formed by two control cylinders that are placed on either side of the first control cylinder 9, as is clearly visible in FIG. 1. Here, the first point of application 10 is located on the second robot arm construction portion 6 at least approximately halfway the second robot arm construction portion 6. In order to obtain a virtually horizontal movement of the free end of the robot arm 4, the first point of application 10 on the second robot arm construction portion 6 is located at the side of the second robot arm construction portion 6 opposite the fencing 2. The first point of application 13 on the first robot arm construction portion 5 is located closer to the second horizontal axle 8 than to the first horizontal axle 7. In order to obtain a relatively compact construction, the first point of application 10 on the first robot arm construction portion 5 is orientated towards the robot arm 4.

The robot arm construction 3 is displaceable in the longitudinal direction of the milking parlour 1 by means of a support unit 15 which is displaceable along rails 16 and 17. The rail 16 is placed at the upper side of the fencing 2 and the rail 17 is disposed, in both embodiments, approximately at half the height of the milking parlour 1 at the longitudinal side of the fencing 2 and namely at that side where the robot arm construction 3 is located. Both at its upper side and its lower side the support unit 15 is provided with rollers 18, 19 and 20. It is possible for the support unit 15 to be displaced along the rails 16, 17 by means of a control cylinder (not shown) whose point of application on the support unit 15 is denoted by reference numeral 21. The first horizontal axle 7 and the second horizontal axle 8 are disposed on the support unit 15, and the second point of application 11 of the first control cylinder 9 and the second point of application 14 of the second control cylinder 12 act on the support unit 15.

FIG. 3 shows in detail the free end of a robot arm, for example the robot arm 4. On the free end of the robot arm 4 there are provided four teat cups 28, one of which is visible in the shown view. The teat cups 28 are each connected to a hose 29 for discharging milk from the teat cup 28 and a not shown hose for applying a pulsation vacuum.

The free end of the robot arm 4 comprises a support element 30. For each teat cup 28 there is provided a housing 35 which is connected to the support element 30 by means of a hinge pin 36. Each housing 35 is provided with a coupling mechanism 37 which comprises a bent lever 38 and a control lever 39. At one end, the bent lever 38 is connected to the housing 35 by means of a hinge pin 40. At the other end, the bent lever 38 is connected to the control lever 39 by means of a hinge pin 41. At its other side, the control lever 39 is connected to a holder 43 for the teat cup 28 by means of a hinge pin 42. The holder 43 is further connected to the housing 35 by means of a hinge pin 44. In the housing 35 there is further provided a control cylinder 45 which is connected to a support element 30 and at the other side to the bent lever 38.

In the situation of FIG. 3 the control cylinder 45 is retracted, as a result of which the housing 35 is in a low position and the holder 43 with the teat cup 28 is tilted. By extending the control cylinder 45, the holder 43 and the teat cup 28 tilt towards a vertical orientation (not shown). Further operation of the control cylinder 45 results in that the housing 35 moves upward in order to attach the teat cup 28 to the teat 46.

After the teat cup 28 has been attached to the teat 46, the housing 35 is moved downward. The teat cup 28 then remains connected to the housing 35 by means of a cord 50. The cord 50 extends from the lower side of the teat cup 28, through the holder 43 and below a roller 51, to a control cylinder 52. During the downward movement of the housing 35, the control cylinder 52 is retracted in order to release the cord 50. By extending again the control cylinder 52 the cord 50 pulls the teat cup 28 back to the holder 43. For a more detailed description of the robot arm construction 3 reference is made to EP-A1-1 442 657. For a more detailed description of the operation of the teat cups 28 reference is made to EP-A1-862 360.

On the robot arm construction 3 there is provided a sensor, in this case a 3D camera 100. The 3D camera 100 comprises a housing 101 of synthetic material which, in the embodiment of FIG. 3, is movably connected to the support element 30 via a ball joint 102. The 3D camera 100 is capable of rotating about a vertical axis by means of the ball joint 102 and of tilting about a horizontal axis by means of the ball joint 102 with the aid of not shown actuators, for example servo motors.

Figure 2:
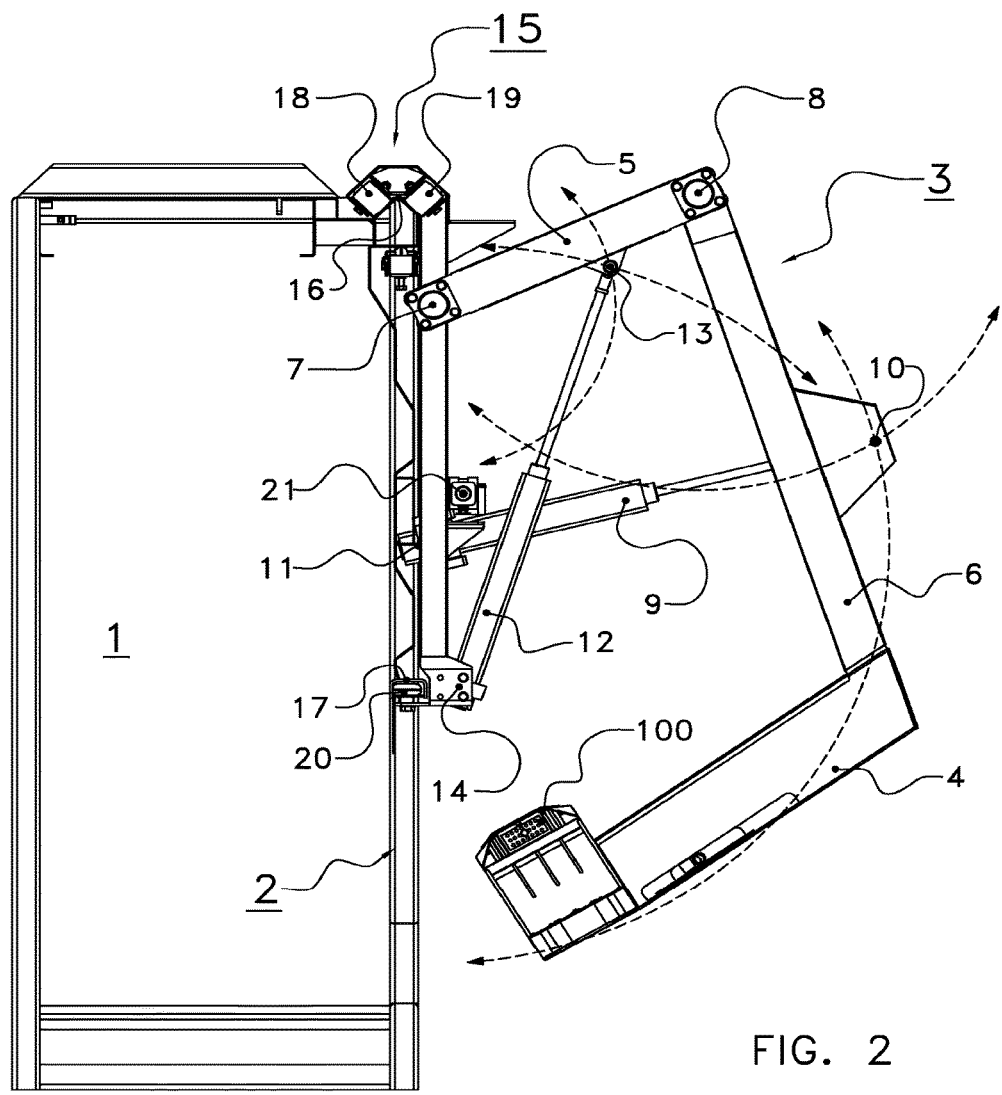
FIG. 2 is a front view of the implement shown in FIG. 1.

Alternatively, the 3D camera 100 may be rigidly connected to the robot arm 4 (embodiment FIGS. 1 and 2), or be individually movably connected, via an arm 103, to another part of the milking implement, for example to the fencing 2 (partially shown in the embodiment of FIG. 4).

The housing 101 comprises a front side 104. In the front side 104 there are included a lens 106 and a plurality of radiation sources, in this embodiment light sources 108 in the form of infrared light emitting diodes (IR LED's). In a variant, the lens 106 is provided at the inner side of the front side 104, the front side 104 being manufactured from a material that is transmissive of infrared light. The lens 106 is thus protected against external influences, while the flat front side 104 of synthetic material can more easily be cleaned than the front side 104 with the projecting lens 106.

In the housing 101 there is further included a place-sensitive sensor, such as a CMOS image sensor 110. The CMOS image sensor 110 comprises, on a side facing the lens 106, a matrix with a plurality of rows and columns of receivers, in the form of light-sensitive photo diodes. In this embodiment, this is a matrix of 64×64 photo diodes, but resolutions of 176×144, 640×480, and other, smaller or higher, matrix sizes are possible as well. The CMOS image sensor 110 comprises integrated sensor control unit (not shown) which controls the IR-LED's 108 and which convert the infrared light incident on each of the photo diodes into a digital signal and transfer this via a not shown wireless connection, or wire connection to a central processing unit, or a computer (see also hereinafter).

The sensor control unit of the 3D camera 100 determines the distance from an object to each of the photo diodes by measuring a phase difference between the light that is emitted by the IR-LED's 108 of the 3D camera 100 to an object and the light that returns after reflection to the 3D camera 100, i.e. to the CMOS image sensor 110 thereof.

In a favourable embodiment, the IR-LED's 108 emit an amplitude-modulated waveformed light signal. The amplitude modulation has itself a repetition frequency. After reflection this light signal is imaged by the lens 106 on the CMOS image sensor 110. By determining the phase difference of the received modulated light signal relative to the emitted modulated light signal it is possible to calculate, by means of the wave length of the modulated signal, the distance between the sensor and the object. This occurs in parallel for each of the photo diodes on the CMOS image sensor 110. There is thus created a three-dimensional image of the observed object.

It is pointed out that in this manner the distance has not yet been determined unambiguously. For, it is possible for an object to be located at a plurality of wave lengths of the used light signal of the sensor. This can be solved in practice, for example, by also varying the frequency of the amplitude modulation.

In a particular embodiment, short light pulses may be emitted by the IR-LED's 108, provided that at least one whole wave, preferably two, or a plurality of waves, of the modulated signal is/are incident in each light pulse.

FIG. 5 shows schematically a robot control, or robot control unit, here in the form of a control system 120 of a milking robot, for example the robot arm construction 3. The control system 120 comprises a central processing unit 122 for controlling one or a plurality of actuators 124, and a user's station in the form of a personal computer (PC) 126. The actuators 124 may be the control cylinders 9, 12, 45 and 52 for the robot arm construction 3, as described in relation to FIGS. 1-3, and, possibly, the not shown servo motors for focusing the 3D camera 100 itself.

The central processing unit 122 has a working memory and is programmed with control software and interprets, on the basis of algorithms, or fuzzy logic control, the three-dimensional images from the 3D camera 100. On the basis of this interpretation, the central processing unit 122 controls one or a plurality of actuators 124, as will be described hereinafter in further detail.

The central processing unit 122 is connected to the PC 126 via a fixed, or wireless, connection. Via the PC 126, it is possible for the control software of the central processing unit 122 to be loaded and/or to be adapted. Furthermore, it is possible for a monitor of the PC 126 to display a whether or not processed image from the 3D camera 100. It is further possible for this screen to display warnings, if any, if the central processing unit 122 establishes, on the basis of the image from the 3D camera 100, that a disturbance, or other undesired event, takes place. Finally, it is possible for the PC 126 to be provided with, or to be connected to a storage medium (not shown) in which images from the sensor and/or processed information can be stored.

During operation, the robot arm construction 3 will be located at a side of the milking parlour 1. The 3D camera 100 is then focused on the entrance door (not shown). As soon as a cow reports at the entrance door she is observed by the 3D camera 100. The control system 120 generates a three-dimensional image of a part of the cow. For this purpose, the sensor control unit on the CMOS image sensor 110 determines a phase difference between light that is emitted by the IR-LED's 108 and light that is reflected from a plurality of points of the cow to the 3D camera 100. In this case, the light reflected from the plurality of points of the cow is incident on various receivers of the matrix with receivers on the CMOS image sensor 110.

This phase difference is converted for each receiver of the matrix by the CMOS image sensor 110 or by the central processing unit 122 into a distance from the 3D camera 100 to the plurality of points on the cow.

Depending on the chosen frequency of the amplitude modulation, it is possible for the 3D camera 100 to make a plurality of images, for example fifty, per second. Each image should in this case be considered as a reliable reproduction of the teat, or other part of the cow, any movement of the cow leading to much less distortion of the image than in the case of a scanning sensor according to the state of the art. Moreover, it is not necessary to move the 3D camera 100 itself for taking a complete shot. As a result thereof, it is possible for the robot arm construction 3 to be moved to the teat 46 in a reliable manner, as will be described hereinafter in further detail.

In the memory of the central processing unit 122 there is included a data base with the spatial characteristics of a plurality of, preferably all, cows of the herd to be milked. On the basis of the observed three-dimensional image the cow concerned is identified and it is possible to determine whether she will be admitted to the milking parlour 1.

After the cow has entered the milking parlour 1, or while she is still in the entrance door, there is further made a three-dimensional image of the udder and the teats of the cow. On the basis of the size of the udder and/or on the basis of historical data relating to the cow concerned, it is determined whether this cow should be milked. If this is not the case, the exit door is opened to make the cow leave the milking parlour 1 if she had already been admitted. If the cow had not yet been admitted, the entrance door to the milking parlour 1 is not opened for this cow.

While the cow enters the milking parlour 1, the 3D camera 100 continues to take shots of the cow. On the basis of these shots the central processing unit 122 determines when the cow has completely entered the milking parlour 1. At this moment one of the actuators 124 is operated for closing the entrance door. There is further supplied an amount of feed attuned to the observed cow to a feed trough (not shown) which is located at an end of the milking parlour 1.

After the cow has entered the milking parlour 1, the 3D camera 100 takes at least one shot of the entire cow, or at least of the udder and preferably also of the hind legs of the cow. On the basis thereof it is possible for the central processing unit 122 to determine the spatial position of the udder and, possibly, of the hind legs. It is pointed out that in the state of the art the position of the hind legs of the cow is determined indirectly, by determining the rear side of the cow by means of a feeler sensor, or by determining the centre of gravity of the cow with the aid of weighing means in the floor of the milking parlour 1. The 3D camera 100 is thus capable of replacing such a feeler sensor and/or weighing means.

On the basis of the images from the 3D camera 100, and in particular the spatial position of the udder and, possibly, the hind legs deduced therefrom, the central processing unit 122 moves cleaning rolls known per se and not shown here to the teats 46 to be milked. The 3D camera 100 then continues to follow the relevant cleaning rolls and the central processing unit 122, thanks to the relatively high image frequency of the 3D camera 100, will be able to calculate the rotational speed of the relevant cleaning rolls. If this rotational speed becomes too low, this implies that the pressure on the teat 46 concerned is too great and an actuator is controlled to reduce the relevant pressure. The 3D camera 100 thus saves a separate sensor for observing the rotational speed of the cleaning rolls.

After a first cleaning of the udder with the teats 46, the central processing unit 122 determines whether the udder has been stimulated sufficiently to be able to start milking. For this purpose, with the aid of the 3D camera 100 there is made again a three-dimensional image of the udder and the teats 46. This three-dimensional image is compared with one or a plurality of reference images. These may be images of the cow concerned that are stored in the memory of the central processing unit 122 and/or of the PC 126, and/or images of the udder with the teats 46 that have been made before the cleaning. If the shape and/or the size of the udder and/or the teats 46 concerned has/have changed at least to a predetermined extent, then the central processing unit 122 concludes that the udder has been stimulated sufficiently.

On the basis of the spatial positions of the teats 46 and, possibly, on the basis of the (preferably observed again) three-dimensional image of the positions of the legs, the central processing unit 122 subsequently determines the route to be followed by the robot arm 4. The central processing unit 122 moves the robot arm 4 and in particular the teat cups 28 located thereon to the teats 46 concerned.

Depending on the embodiment of the relevant robot arm construction 3, the teat cups 28 are moved successively or simultaneously to the teats 46 concerned and attached thereto. Preferably, the central processing unit 122 bases the desired movement of the robot arm 4 on a simultaneous observation of both the teat 46 and the teat cup 28 to be attached. It is possible for the central processing unit to deduce therefrom a mutual distance, direction and speed, which further improves the accuracy of the navigation. This has also the advantage that variations of the position of the teat cup 28 are processed automatically. Such variations occur, for example, if the teat cup 28 is not always received in the same manner in its holder 43.

After the teat cups 28 have been attached to the teats 46, the 3D camera 100 continues to observe the teat cups 28, the teats and, possibly, a larger part of the cow. It is possible for the central processing unit 122 to conclude, on the basis of any mutual movement between the teat cup 28 and the teat 46 concerned, that the connection between the teat cup 28 and the teat 46 decreases and that the milking by means of the relevant teat cup 28 should (almost) be finished. At a sudden great mutual movement of the teat cup 28 relative to the teat 46 concerned, it is possible for the central processing unit 122 to conclude that the relevant teat cup 28 has come loose from the teat 46 concerned, for example because the cow has kicked against it. In that case, it is possible for the central processing unit 122 immediately to take a measure, for example by tightening the cord 50, in order to ensure that the relevant teat cup will not fall onto the floor of the milking parlour 1, where it could be contaminated. It is also possible for the central processing unit 122 to take preventive measures, such as separating the possibly contaminated milk and/or cleaning the relevant teat cup 28 and the associated milk hose 29.

By making the 3D camera 100 observe a larger part of the cow than only the udder with the teats 46, it is possible, for example, also to observe the legs of the cow concerned. On the basis of the observation of the legs and/or other parts of the cow, it is possible for the central processing unit 122 to determine a risk that a leg kicks off a teat cup, or that the leg concerned would hit the robot arm construction 3. It is also possible for the central processing unit 122 to determine, on the basis of a three-dimensional image of the cow's back, a risk that the cow will relieve herself. If the central processing unit 122 determines that a risk of kicking off and/or the cow relieving herself is greater than a predetermined value, it may decide to take preventive measures, such as displacing the robot arm construction 3, or preventively tightening the cord 50.

At a given moment, the central processing unit 122 will establish that the cow concerned has been milked sufficiently, because it is established on the basis of the image from the 3D camera 100 that the size of the udder has decreased to a predetermined extent and/or because the relevant teat cups 28 and the teats 46 begin to move relative to each other, as described in the foregoing. At that moment the central processing unit 122 will order to detach the teat cups 28, to move them via their cords 50 to the relevant holders 43, and to move the robot arm 4 from under the cow. Subsequently, the exit door will be opened. On the basis of the images from the 3D camera 100, the central processing unit 122 will be able to establish when the cow has completely left the milking parlour 1, after which it will be possible for the relevant actuator to close the exit door.

After milking, or at any rate before milking a next cow, the teat cups 28 and the associated milk hoses 29 can be cleaned. For this purpose, there is provided a cleaning unit known per se and not shown here. It comprises a cleaning spraying nozzle which sprays a cleaning liquid, such as water, into one of the teat cups 28. The cleaning liquid is sucked off via the relevant milk hose 29 and thus also cleans the relevant hose. The cleaning unit is provided in, or near, the milking parlour 1 in such a way that it is possible for the robot arm construction 3 to move the holders 43 with the teat cups 28 to the cleaning unit. For this purpose, the 3D camera 100 makes one or more three-dimensional images of the teat cups 28 and the cleaning unit. It is thus possible for the central processing unit 122 to control the actuators 124 of the robot arm construction 3 on the basis of the actual positions of the teat cups 28 and the cleaning unit. This is advantageous for controlling on the basis of predetermined and pre-calculated positions, because the actual positions may deviate therefrom, for example because of external loads on the robot arm construction 3 and/or on the cleaning unit, such as pushing or kicking by a cow.

If desired, it is possible for the central processing unit 122 to observe by means of the images from the 3D camera 100 whether the milking parlour 1 is contaminated to a greater or lesser extent and to decide, on the basis thereof, to clean the milking parlour 1 and/or the surrounding fencing 2 and/or the robot arm construction 3. In this case it is possible for the central processing unit 122 to check again, on the basis of the image observed by the 3D camera 100, whether the milking parlour 1 is completely free of animals, human beings, or objects that hinder a cleaning. During the cleaning it is possible for the central processing unit 122 to check and, if desired, to adjust the progress of the cleaning. For a more detailed description of a cleaning device that may possibly be used, reference is made to US-A1 2004/0103846. It is pointed out here that it is particularly advantageous that the 3D camera 100 is capable of replacing one, or a plurality, of the specific sensors and cameras from the relevant publication. This means saving of cost both for the relevant sensors and cameras and for the control systems related thereto.

Within the scope of the invention various variants are possible. For example, It is also possible, to apply for the sensor, instead of infrared light, light with other wave lengths, among which visible light. Instead of amplitude modulation, frequency modulation may also be applied. It is also possible to provide the light sources at another position than on the housing of the lens and the image sensor, for example by means of a separate housing on the robot arm. In that case it is indeed of importance, of course, that the distance between the light sources and the image sensor is known, so that the calculated distance from the teat observed can be corrected accordingly.

The sensor may be connected movably, instead of rigidly, to the robot arm, or be connected, separately from the robot arm, rigidly or movably at a position near the milking parlour, for example to the fencing.

The control system does not have to be set up around a central processing unit. There may also be provided decentralized processing units, whether or not integrated with existing components, such as the CMOS image sensor. By also designing the actuators with decentralized processing units there may even be obtained a network control, in which the various decentralized processing units are in direct communication with each other.

It is advantageous to have a great number of tasks of the implement for automatically milking a cow performed on the basis of the three-dimensional images from one 3D camera, as described above. There is thus saved on purchase and maintenance of various separate sensors. However, the invention is already advantageous if only one task, or a combination of a smaller number of tasks, is performed on the basis of the images from the 3D camera. In such cases the 3D camera does not have to observe specifically a teat, but other parts of a cow, or even an entire cow. The 3D camera may be used advantageously, for example, for recognizing a cow that reports in order to be milked. It is also advantageous to control only the cleaning of the milking parlour on the basis of the images from the 3D camera.

In a variant, it is possible to apply a plurality of 3D cameras, in which case one of them, for example, is intended for observing substantially the entire cow during a substantial part of the time, while a second 3D camera is intended for taking detailed shots, for example of the teats. In this variant, it is of importance to synchronize the relevant light sources, or to attune them to each other in another manner. It is possible, for example, to apply light with mutually deviating frequencies. It is also possible to emit light pulses in an alternating manner. This may be coordinated by the central processing unit. However, it is also advantageous to cause a sensor to observe that a light pulse is received from another sensor, and to cause it to emit itself a light pulse at a short, predetermined moment thereafter.

Furthermore, an implement for automatically milking according to the invention may also be used advantageously for other dairy animals, such as goats. Other types of milking implements may also be used, such as implements with a totally different type of milking robot, implements in which a robot arm is moved to and from the cow with the aid of differently orientated axes of rotation, or implements in which the cow has a greater extent of freedom of movement.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An implement for automatically milking a dairy animal, comprising:
    a milking parlour;
    a milking robot for automatically attaching a teat cup to a teat, the milking robot comprising a robot arm having at least two pivoting joints, a 3D sensor being disposed on an end of the robot arm, which the 3D sensor is configured to observe the teat of the dairy animal and the teat cup, and a robot control unit operatively connected to a 3D sensor,
    wherein the 3D sensor comprises:
    a radiation source for emitting electromagnetic radiation;
    a receiver comprising a matrix with a plurality of rows and a plurality of columns of receivers configured to receive electromagnetic radiation reflected from the dairy animal and the at least one teat cup;
    a lens for imaging the reflected electromagnetic radiation onto the receiver;
    a sensor control unit;
    wherein the sensor control unit is operatively connected to the radiation source to modulate the electromagnetic radiation, and
    wherein the sensor control unit is programmed to determine for each of the receivers a phase difference between the emitted and the reflected electromagnetic radiation to calculate distances from the 3D sensor to a plurality of points on the diary animal including the teat and further programmed to calculate distances from the 3D sensor to a plurality of points on the teat cup and transmitting these calculated distances to the control unit;
    wherein the robot control unit is programmed to calculate a mutual distance between the teat cup and the teat and to control motion of the at least two pivoting joints of the robot arm and further to control a longitudinal displacement of the robot arm, on the basis of the calculated mutual distance to move the teat cup to the teat.

2. The implement according to claim 1, wherein the robot control unit monitors the connection between an attached teat cup and the teat concerned.

3. The implement according to claim 1, wherein:
    the sensor control unit repeatedly determines the phase difference between the emitted and the reflected electromagnetic radiation in order to calculate distances from the sensor to a plurality of points on the teat and on the teat cup; and
    the robot control unit determines with the aid thereof the mutual speed between the attached teat cup and the teat concerned.

4. The implement according to claim 1, wherein:
    the sensor control unit determines a phase difference between the emitted and the reflected electromagnetic radiation in order to calculate distances from the sensor to a plurality of points on at least one leg of the animal to be milked; and
    the robot control unit controls the milking robot also on the basis thereof.

5. The implement according to claim 1, wherein the robot control unit determines whether the dairy animal should be milked on the basis of the calculated distances from the sensor to the plurality of points on the teat and/or on the basis of calculated distances from the sensor to a plurality of points on an udder.

6. The implement according to claim 1, wherein the robot control unit is designed to identify the dairy animal on the basis of the calculated distances from the sensor to the plurality of points on the dairy animal.

7. The implement according to claim 1, wherein the robot control unit controls cleaning brushes for cleaning the teat of the dairy animal on the basis of the calculated distances from the sensor to a plurality of points on the teat of the dairy animal and/or on the basis of calculated distances from the sensor to a plurality of points on the cleaning brushes.

8. The implement according to claim 1, wherein the robot control unit starts a cleaning process of the milking parlour if the robot control unit establishes that there is no dairy animal in the milking parlour on the basis of observation by the sensor.

9. The implement according to claim 1, further comprising a cleaning device for cleaning at least the teat cup, wherein:
    the sensor control unit determines a phase difference between the emitted and the reflected electromagnetic radiation in order to calculate distances from the sensor to a plurality of points on the cleaning device; and
    the robot control unit controls, on the basis thereof, the milking robot in such a way that the teat cup is moved to the cleaning device in order to be cleaned.

10. The implement according to claim 1, wherein:
    the sensor control unit determines repeatedly the phase difference between the emitted and the reflected electromagnetic radiation in order to calculate distances from the sensor to a plurality of points on the dairy animal; and
    the robot control unit determines with the aid thereof the mutual speed between the sensor and the relevant plurality of points on the dairy animal.

11. The implement according to claim 1, wherein a wave length of the modulation of the emitted electromagnetic radiation is between 1 mm and 5 meters.

12. The implement according to claim 11, wherein the wave length is adjustable.

13. The implement according to claim 11, wherein the wave length is switchable between at least two values.

14. The implement according to claim 1, wherein the radiation source emits radiation in a pulsating manner.

15. The implement according to claim 14, wherein the radiation source emits radiation with a pulsation frequency between 1 Hz and 100 Hz.

16. The implement according to claim 1, wherein the radiation source has an adjustable light intensity and/or an adjustable angle of radiation.

17. The implement according to claim 1, wherein an angle of view of the sensor is adjustable.

18. The implement according to claim 1, wherein the matrix with a plurality of rows and a plurality of columns of receivers is arranged pivotably.

19. The implement according to claim 18, wherein the radiation source is arranged pivotably.

* * * * *